Nov. 13, 1945.  R. M. DILWORTH ET AL  2,388,782
TRANSITION CONTROL SYSTEM
Filed Nov. 6, 1944   2 Sheets-Sheet 2

INVENTORS
Richard M. Dilworth &
Torsten O. Lillquist
BY
Blackmore, Spencer & Hint
ATTORNEYS Patented Nov. 13, 1945

2,388,782

UNITED STATES PATENT OFFICE 2,388,782

TRANSITION CONTROL SYSTEM

Richard M. Dilworth, Hinsdale, and Torsten O. Lillquist, Clarendon Hills, Ill., assignors to General Motors Corporation, Detroit, Mich., a corporation of Delaware Application November 6, 1944, Serial No. 562,232

5 Claims. (Cl. 290—3)

The present invention generally relates to generating electric traction systems for locomotives and more particularly relates to combined load indicating and controlling means therefor.

In conventional systems of the above type, manual speed and load controlling means and operating rules are provided the locomotive engineers giving the safe values of operating speed or load or the operating time over given grades for certain positions of the manual controls to prevent overloading of the locomotive traction system. These rules are often disregarded and cannot cover all operating conditions encountered. Load indicators also are sometimes provided to guide the engineer in operating the controls but as the range in load values, for each traction motor circuit connection provided, overlap for both increasing and decreasing speed and load values, overlapping indicating ranges must accordingly be provided on the indicator making these indications difficult to follow and hence overloading is liable to occur before, during, and after an improper change in the controls by the engineer.

The principal object of the present invention is to provide in a generating electric locomotive combined manually operable controlling means and control indicating means which overcomes the faults of existing systems by the provision of an indicator and modifying means therefor controlled in combination with the power system control means by operation of the controlling means to permit the indicator scale to be provided with separate and distinct easily read divisions, each division indicating the most efficient load and speed range for each traction motor power circuit relation established by the controlling means so that the locomotive engineer may readily follow these indications and properly operate the controlling means and thereby prevent both underloading and overloading of the power system and to also prevent sudden overloading and electrical and mechanical stresses on the traction units and also on the locomotive and train coupled thereto upon changes in the positions of the controlling means.

Another object is to provide easily read subdivisions in the indicator scale division corresponding to the maximum load and minimum speed operating range of the locomotive for clearly indicating the maximum continuous and short time rating of the traction system based on the temperature, load, time rating of the traction system to prevent overloading and overheating thereof.

The combined generating electric traction control, and indicating system by which the above objects are accomplished will become apparent by reference to the following detailed description and accompanying drawings illustrating one form of such system.

Figure 1 of the drawings is a diagrammatic view of the combined traction, control and indicating system.

Figure 1:
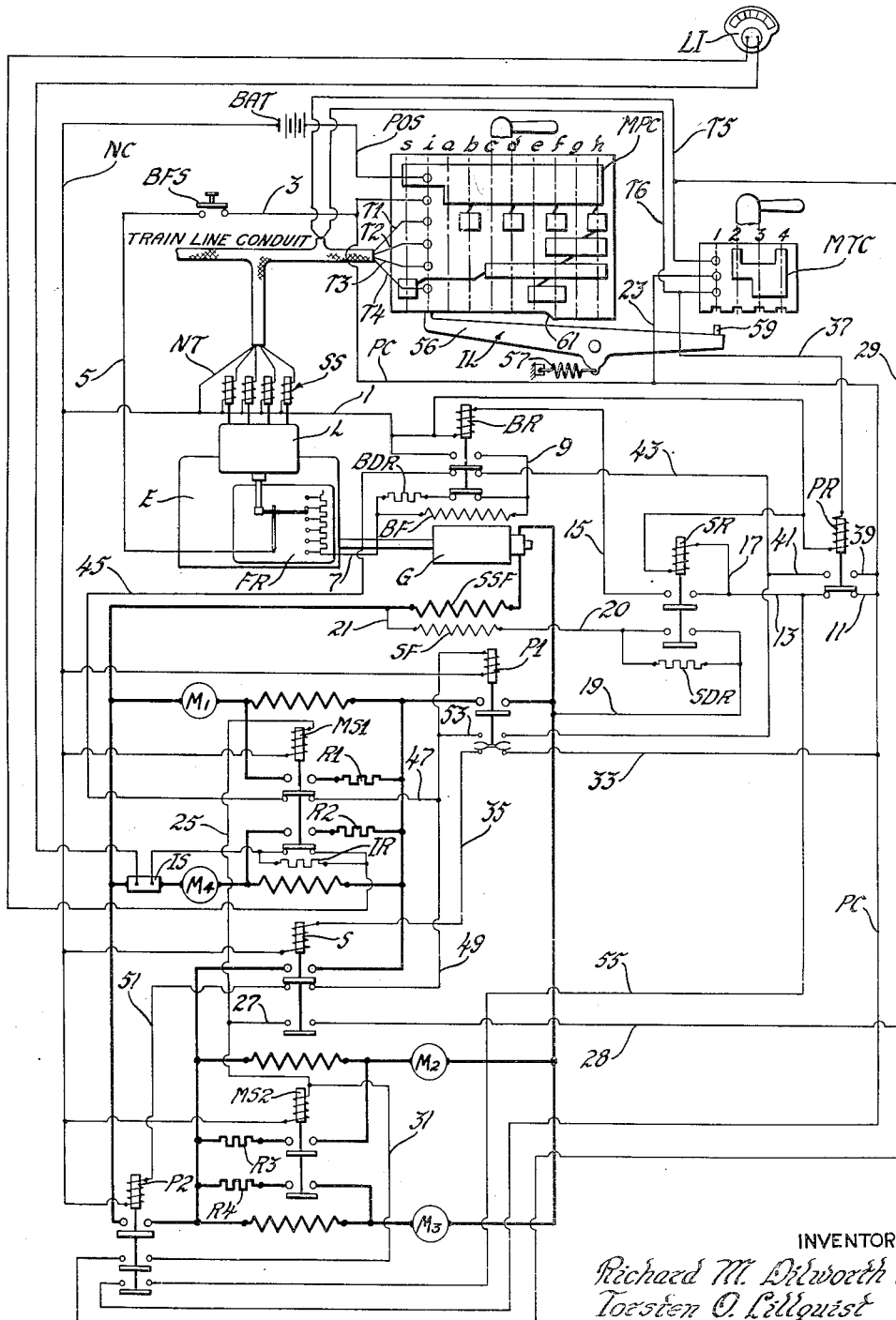

As best illustrated in Figure 1 the generating electric traction system comprises a power plant including a Diesel engine E operably connected to an electric generator G which is electrically connected by power circuit conductors, shown in heavy lines, to a plurality of series type traction motors M1 to M4, each operatively connected in any well known manner to a separate driving axle of the locomotive, not shown, having pairs of driving wheels secured thereto.

Electromagnetic contactors S, P1, P2, MS1 and MS2 and motor field shunting resistors R1 to R4 are shown included in the power circuit conductors along with an indicator shunt IS, shown connected in series with the motor M4. It will be apparent with the arrangement of power circuit conductors shown that when the armature of the series contactor S is moved upwardly from the normal position, as shown, upon energization of the contactor winding, the upper armature contact is moved out of contact with the central pair of stationary interlocking contacts provided thereon and into contact with the upper pair of stationary power contacts. The power contacts are shown connected in series relation between separate pairs of motors, each pair shown connected in parallel, to cause the establishment of a series-parallel motor starting circuit connection with the power plant generator G. Upward movement of the armature of the series contactor S also causes the lower armature contact to bridge the lower pair of stationary interlocking contacts provided thereon. It will likewise be evident with the power connections shown that when the winding of the contactor P1 is energized the upper armature contact will contact the upper pair of stationary power contacts provided thereon and shown connected in series between the generator G so that the motors M1—M4 are each connected in parallel running circuit relation with the generator. The parallel contactor P1 is also provided with two flexible interlocking armature contacts, the lower flexible contact normally contacting the lower pair of stationary interlocking contacts of this contactor and the upper flexible contact is arranged to contact the central or upper stationary pair of interlocking contacts of the contactor before the lower pair are opened by the lower flexible armature contact by upward movement of the armature upon energization of the contactor winding. Upon energization of the winding of the contactor P2 the armature is moved upwardly so that the three contacts provided on the armature contact the three pairs of stationary contacts provided thereon. The closure of the upper pair of stationary or power contacts of the contactor P2, shown connected in series relation between the generator and the other pair of motors M2 and M4 to likewise cause each of these motors to then be connected in parallel running circuit relation with the generator G. Energization of the windings of both of the parallel contactor windings accordingly causes the establishment of the parallel or running motor circuit relation.

Simultaneous energization of the separate winding of each of the motor field shunting contactors MS1 and MS2 causes the armatures thereof to be moved upwardly from the normal position shown so that two of the armature contacts of each are caused to contact separate pairs of stationary power contacts provided thereon. Each of these pairs of stationary power contacts are shown connected in series with a separate motor field shunting resistor across one of the motor series field windings to cause a reduction in the excitation of the motors. When the windings of the motor field shunting contactors MS1 and MS2 are energized simultaneously while the windings of series contactor S is energized a motor series-parallel-shunt circuit relation with the generator is established and when the windings of the field shunting contactors MS1 and MS2 are energized while the windings of contactors P1 and P2 are energized a parallel-shunt motor circuit relation is established. It will be evident that the shunting of the motor field windings causes an increase in the speed and torque range of the motors when they are connected in either the series-parallel or parallel relations.

It will be noted that the shunting contactor MS1 is also provided with two pairs of stationary interlocking contacts, the lower pair of which are normally bridged by the lower armature contact and are shown connected in series relation with a load indicator LI across the indicator shunt IS which is connected in series relation with the motor M4. The load indicator LI is shown located adjacent a manually operable master transition controller MTC and a master power controller MPC with mechanical interlocking means shown therebetween and indicated generally at IL, to be described later. An indicator modifier comprising a resistor IR is shown connected directly across the lower interlocking contacts of the contactor MS1 so that when these contacts are opened, the modifying resistor IR is connected in series relation with the indicator across the indicator shunt to reduce the sensitivity of the indicator so that it will indicate values of current per motor lower than the actual value when the motors are connected in either the series-parallel-shunt or parallel-shunt power circuit relations.

As will be subsequently described in detail the indicator is provided with a dial having divisions numbered 1 to 4 corresponding to control positions 1 to 4 of the master transition controller MTC causing establishment of the series-parallel, series-parallel-shunt, parallel and parallel-shunt motor connections. Each of the dial divisions correspond to the most efficient speed and load range of the traction system for each above mentioned motor circuit relations established by movement of the drum of this controller to the positions corresponding to the divisions on the indicator dial. The master controllers MPC and MTC are each of the drum type having stationary contacts connected by train line, control and interlocking connections, shown in lighter lines in Figure 1, which connections serve to interconnect the interlocking contacts on the series, parallel and motor field shunting contactors, the generator field control relays BR and SR, a parallel relay PR and speed, load and output regulating means of the power plant generally indicated at L. The train line conductors serve to control the speed, load and output regulating means L of the power plant and the relays and contactors on one or more locomotives when these means are connected in multiple by these train line conductors in conventional manner by suitable jumper connectors between the locomotives.

The power plant speed, load and output regulating means L, includes a conventional governor, not shown, which operates in response to variations in the engine speed for varying the fuel supplied to the engine to vary the torque thereof and for also controlling a generator field rheostat FR in a well known manner to vary the load on the engine to cause operation of the engine and generator power plant at any one of a plurality of constant values of speed, load and output depending upon the setting of the governor speed setting means. The governor speed setting means is of any well known type and is controlled in steps by a plurality of electromagnetically actuated speed setting means, indicated generally at SS, in a well known manner, by providing suitable stationary contacts and electrically interconnected contacts cooperating therewith on the manually movable drum of the master power controller MPC. The four lower stationary contacts of the power controller are shown connected to separate train line conductors T1 to T4, shown entering a train line conduit and a branch conductor leads from each of these train line conductors to one winding terminal of each of the electromagnetic means SS. The other terminal of each of these windings is connected by a conductor 1 to a negative train line conductor NT, which is also shown entering the train line conduit and also to a negative control conductor NC, shown connected to the negative terminal of a battery BAT. The lower winding terminals of the contactors S, P1, P2, MS1 and MS2 are shown directly connected to the negative control conductor NC by separate return conductors and the lower winding terminals of the relays BR, SR, PR are shown connected to the conductor 1 which, as previously mentioned, is also connected to the negative control conductor NC. The positive battery terminal is connected to the upper stationary contact of the controller MPC by a conductor POS and a positive control conductor PC is connected to the stationary contact, second from the top, of the controller MPC.

The generator G is provided with a separately excited field winding BF, a shunt field winding SF and a series field winding SSF. The separately excited field winding BF is connected in series with a manually operable generator field switch BFS, the governor operated field rheostat FR and the upper pair of stationary contacts of the relay BR between the positive control conductor PC and conductor 1 by conductors 3, 5, 7 and 9. A field discharge resistor BDR is connected in series with the lower pair of normally closed stationary contacts of the relay BR across the terminals of the separately excited field winding BF so that the discharge resistor BDR is normally shunted directly across the separately excited field winding which is normally disconnected from the negative battery terminal as the upper pair of stationary contacts of the relay BR are normally open. The separately excited field winding BR is accordingly deenergized and discharged when the armature contacts of the relay BR are in the normal position. The upper winding terminal of the relay BR is connected in series with the normally open upper pair of stationary contacts of the relay SR and the normally closed lower pair of stationary contacts of the relay PR between positive control conductor PC and negative control conductor NC by conductors 11, 13 and 15 and 1. The upper winding terminal of the relay SR is connected by a conductor 17 to the conductor 13 and the lower pair of stationary contacts of the relay SR are connected in series with the generator shunt field winding SF across the generator armature power conductors by conductors 19, 20 and 21. A field discharge resistor SDR is connected directly across the lower normally open pair of stationary contacts of the relay SR so that the discharge resistor SDR is normally connected in series with the shunt field winding and the resistance of this discharge resistor limits the excitation current flowing in the shunt field to a low value.

The master transition controller MTC is provided with three stationary contacts and a contact cooperating therewith secured on the manually movable controller drum. The central stationary contact of the transition controller MTC is connected to the positive control conductor PC by a conductor 23 and the other two stationary contacts are connected to separate train line conductors T5 and T6 shown entering the train line conduit. The upper winding terminals of the shunting contactors MS1 and MS2 are each connected together by a conductor 25 and this conductor is connected in series with the normally open lower pair of stationary interlocking contacts of the series contactor S to the train line conductor T5 by conductors 27, 28 and 29. The conductor 25 connecting the windings of the contactors MS1 and MS2 is also connected in series with the normally open central pair of stationary interlocking contacts of the parallel contactor P2 to the conductor 29 by a conductor 31.

The normally closed lower pair of stationary contacts of the parallel contactor P1 are connected in series between the positive control conductor PC and the upper winding terminal of the series contactor S by conductors 33 and 35.

The upper winding terminal of the relay PR is connected to the train line conductor T6 by a conductor 37 and the normally open upper pair of stationary contacts of this relay are connected in series by conductors 39 and 41 between the positive control conductor PC and a conductor 43. One end of the conductor 43 is connected to one of the normally open central pair of stationary contacts of the parallel contactor P1. The other end of the conductor 43 is connected to one of the normally closed central pair of stationary contacts of the relay BR and the other contact of this pair is connected by a conductor 45 to one of the stationary pair of interlocking contacts, second from the top, of the contactor MS1 and the other contact of this pair is connected by a conductor 47 to a conductor 49. The conductor 49 is connected between the upper winding terminal of the parallel contactor P1 and one of the central pair of stationary interlocking contacts of the series contactor S and the other contact of this pair of contacts is connected by a conductor 51 to the upper winding terminal of the parallel contactor P2. A conductor 53 is connected between the conductor 49 and the other central stationary contact of the parallel contactor P1 so that the conductors 43 and 53 serve as a holding circuit between the positive control conductor PC and the winding of the contactor P1 when the central stationary contacts thereof are closed. The positive control conductor PC is directly connected to one of the normally open pair of central stationary contacts of the parallel contactor P2 and as the other contact of this pair is connected by a conductor 55 to the conductor 13.

With the connection arrangement described above and the master controller drums MPC and MTC in the positions shown in Figure 1 none of the windings of the speed setting means SS, relays SR, BR and PR, and contactors S, P1, P2, MS1 and MS2 are energized. This causes the engine to operate at idle speed and prevents excitation of the generator G and also causes the motors M1 to M4 to be disconnected from the generator. Movement of the drum of the master controller MPC from the idle position $i$, as shown, to an engine stop position $s$ causes energization of one winding of the speed setting means causing stopping of the engine. When the generator field switch BFS is closed and the master power controller MPC is moved to position $a$ the windings of the speed setting means are again deenergized to cause operation of the engine at idle speed and the upper pair of stationary controller contacts are bridged by the drum contact to cause energization of the windings of the relays SR and BR and the winding of the series contactor S to cause the motors M1 to M4 to be connected in series-parallel starting circuit relation with the generator G. The generator speed and excitation however is minimum due to the low speed and output setting SS of the load regulating means and substantially no torque is developed by the motors. Energization of the winding of the relay SR takes place through the normally closed lower pair of contacts of the relay PR and conductors PC, 11, 13, 17, 1 and NC to cause closure of the contacts of the relay SR. Closure of the lower pair of contacts of the relay SR causes shunting of the field discharge resistor SDR in the generator shunt field circuit to permit normal flow of current therein and closure of the upper pair of relay contacts causes energization of the winding of the relay BF, through conductors 15, 1 and NC, to cause closure of the upper two pairs of contacts and the opening of the lower pair of contacts of the relay BR. The opening of the lower relay contacts of the relay BR disconnects the discharge resistor BDR from across the separately excited generator field winding BF and the closure of the upper pair of relay contacts completes the circuit to this field winding through the closed switch BFS, field rheostat FR and conductors POS, 3, 5, 7, 9, 1 and NC. The closure of the central pair of contacts of the relay BR sets up an energizing circuit to the winding of the parallel contactor P1, to be referred to later. Energization of the winding of the series contactor S takes place through the normally closed lower pair of interlocking contacts of the parallel contactor P1 and conductors PC, 33, 35 and NC to cause closure of the upper pair of power contacts to establish the series-parallel motor starting connection and closure of the central pair of interlocking contacts to set up an energizing connection comprising conductors 29, 28, 27 and 25, to the windings of the shunting contactors MS1 and MS2.

Starting of the locomotive by the motors M1—M4 when connected in series-parallel starting circuit relation, is accomplished by moving the drum of the master power controller MPC from position $a$ to position $h$. The contact arrangement of the controller MPC for this movement of the drum maintains the above described circuits energized and also causes energization of the windings SS of the speed setting means separately and in combinations in proper sequence to cause a successive increase in speed, load and output of the engine and generator from the minimum to the maximum value.

The mechanical interlocking means, generally indicated at IL, provided between the drums of master power controller MPC and the master interlocking controller MTC prevents movement of the latter when the former is moved to control positions $f$, $g$ and $h$, corresponding to the higher values of speed, load and output of the power plant. The interlocking means comprises a pivoted lever 56 having one end biased by a spring 57 into contact with the drum of the controller MPC and having a detent 59 in the other end adapted to enter any one of four detent slots in the drum of the transition controller MTC. Each of these detent slots are located adjacent positions 1, 2, 3 and 4 of the drum of the controller MTC corresponding to series-parallel, series-parallel-shunt, parallel and parallel-shunt motor connection control positions of the drum. A ramp 61 is provided on the drum of the controller MPC to contact and move the lever 56 when the drum is in positions $f$, $g$ and $h$ to lock the drum of the controller MTC in any one of the four controller positions making it necessary to reduce the speed, load and output of the power plant from the higher values by backward movement of the power controller drum to position $e$ before the motor connections can be changed by movement of the transition controller drum.

Figure 2:
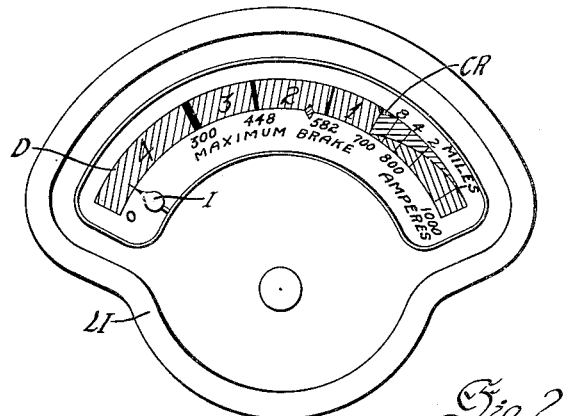
Figure 2 is an enlarged view of the indicator showing the details thereof to better advantage.
Figure 3:
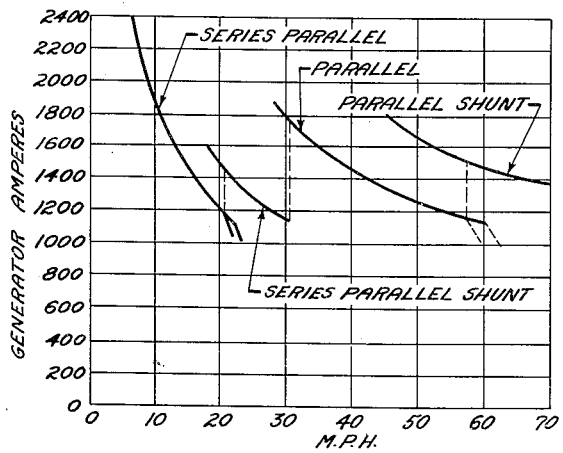
Figure 3 shows graphically the load and speed variations for each of the motor power connections to obtain the best operating efficiency.

Upon starting of the locomotive the back voltage generated by the motors increases with the speed of the motors and the current supplied to the motors by the generator accordingly decreases causing a decrease in the torque of the motors. By reference to Figure 3 it will be noted that the generator current rises to about 2000 amperes when the motors are connected in series-parallel starting circuit relation with the generator upon slow movement of the controller MPC between positions $b$ and $h$. The current per motor is accordingly 1000 amperes and the indicator needle I, see Figure 2, will move to full scale reading of 1000 amperes on the dial D of the indicator LI. This value of current per motor corresponds to the maximum load on the traction system for most efficient operation at low values of speed upon starting of the locomotive. Upon acceleration of the motors and locomotive the motor current and torque will decrease and the needle I will move to the left past the numbered mile subdivisions in division 1 of the dial. Division 1 of the dial corresponds to the most efficient operating load and speed range of the traction system when the motors are connected in series-parallel. Each of the numbered mile subdivisions in division 1 of the dial corresponds to the maximum distance the locomotive traction system can be operated at a preselected load and speed without overloading and overheating. Each of these numbered mile subdivisions correspond to a particular short time safe load rating of the electrical traction machines and are based on a given rate of temperature rise of the machines for the series-parallel motor connections as shown in the load distance curve shown in Figure 4. The arrow CR in division 1 of the dial D represents the safe continuous load rating of 700 amperes per motor shown in Figure 4. It has been found desirable to provide the portion of the indicator dial to the right of the continuous rating mark CR with two colors, red below the curved line and yellow above the curved line to correspond to railway color signals of caution and danger of overloading and overheating of the traction system. The remainder of division 1 of the dial is colored green, as are divisions 2, 3 and 4, to correspond to the most efficient operating speed and load series-parallel-shunt, parallel and parallel-shunt range of the traction system for the motor connections respectively. With the power plant operating at maximum speed, load and power output corresponding to position $h$ of the power controller MPC when the locomotive has accelerated to a speed of approximately 20 miles per hour the load current per motor decreases to a value of 582 amperes, as shown in Figure 3. The needle of the indicator will then be at the 582 ampere mark on the dial between scale divisions 1 and 2. This minimum load value of indicated current of the dial for the series-parallel motor connection at a speed of 20 miles per hour of division 1 is the lowest value of load and highest value of speed for efficient operation of the traction system and is likewise the proper value of load and speed for changing to the series-parallel-shunt connection in the following manner without causing a sudden increase in motor current and a corresponding increase in motor torque and load on the power plant. The speed, load and output on the generator is first reduced by backward movement of the drum of the power controller MPC to position $e$ to release the interlocking means from the slot in the drum of the interlocking controller to then permit movement thereof to position 2 to correspond to the indicator reading and cause establishment of the series-parallel-shunt motor connection.

Movement of the drum of the transition controller to position 2 causes the two upper stationary controller contacts to be bridged by the armature contact to cause energization of the windings of the shunting contactors through conductors PC, T5, 29 and 28 and through the closed lower pair of interlocking contacts of the series contactor S and conductors 27 and 25. This causes closure of both pairs of power contacts on the contactors MS1 and establishment of the series-parallel-shunt motor power connection by insertion of each the motor field shunting resistors R1—R4 across a respective motor series field winding to cause a reduction in the back voltage of the motors and an increase in current supplied thereto and a corresponding increase in the torque and speed range thereof. The lower pair of interlocking contacts of the contactor MS1 are opened at this time causing the indicator resistor IR to be inserted in series with the indicator LI to reduce its sensitivity so that this increase in current will not cause movement of the indicator needle back into division 1 of the dial. The indicator resistor IR is of proper value of resistance to cause the indicator to indicate the same value of current, 582 amperes, even though the actual maximum value of current per motor for most efficient operation of the traction system has increased to 725 amperes or half of the generator current shown on the series-parallel-shunt curve in Figure 3 at a speed of 21 miles per hour.

Maximum acceleration with the motors connected in series-parallel-shunt circuit relation with the generator is obtained by movement of the power controller to the maximum output position $h$. This locks the drum of the transition controller in position 2 by entrance of the detent 59 of the interlocking means IL into the slot in the controller drum adjacent position 2. The indicator needle I will accordingly move to the left in division 2 as the load current decreases upon an increase in the back voltage of the motors and the locomotive speed until the needle is adjacent the 448 ampere scale division between divisions 2 and 3 on the dial corresponding to a speed of approximately 30 miles per hour. This is the minimum indicated load and maximum speed for most efficient operation of the traction system for the series-parallel-shunt motor connection and accordingly is the proper value of load and speed for changing to the parallel connection in the following manner to prevent electrical and torque surges on the units of the traction system. The 448 ampere load indication corresponds to the actual minimum load of 565 amperes per motor or half of the generator current when the motors are connected in series-parallel-shunt relation, and this indicated value of 448 amperes as shown in Figure 3 is substantially equal to the load current per motor or one-fourth of the generator current of 1792 amperes when the motors are connected in parallel with the generator.

Transition of the motor connections from series-parallel-shunt to parallel relation with the generator G likewise requires backward movement of the controller MPC to position $e$ in order to reduce the power supplied the motors and to release the interlocking means to permit movement of the transition controller MTC from position 2 to position 3 to cause this transition of connections, as follows: Movement of the controller MTC from position 2 causes deenergization of the windings of the shunting contactors and their armatures fall to the normal position to cause shunting of the field shunting resistors R1 to R4 and to also cause the shunting of the indicator resistor IR thereby causing maximum excitation of the motor series field windings and to cause the indicator to indicate true values of load current per motor. Movement of the drum of the controller MTC to position 3 causes energization of the winding of the relay PR and upward movement of the armature and closure of the upper pair of relay contacts and the opening of the lower pair of contacts thereof. Opening of the lower contacts causes deenergization of the winding of relay SR and its armature falls to the normal position and causes the discharge resistor SDR to be inserted in series with the generator shunt winding SF and to also cause deenergization of the winding of relay BR causing its armature to also fall to the normal position to cause the opening and discharge of the separately excited generator field winding BF. The generator excitation and therefore its power output is accordingly drastically reduced when the armature of the relay PR moves upwardly upon energization of its winding. The dropping of the armature of the relay BR also causes energization of the winding of the parallel contactor P1 through the normally closed central pair of contacts of the relay BR and the normally closed upper pair of interlocking contacts of the contactor MS1 and conductors PC, 39, 41, 43, 45, 47 and NC. The armature of the parallel contactor P1 is accordingly moved upwardly to first cause the closure of the central pair of interlocking contacts thereon and finally to cause closure of the upper pair of power contacts and the opening of the lower pair of interlocking contacts simultaneously. Closure of the central pair of interlocking contacts of the parallel contactor P1 establishes a holding circuit to the contactor winding through conductors 43 and 53. Closure of the power contacts causes the motors M1 and M4 to be connected in parallel with the generator and the opening of the lower interlocking contacts causes deenergization of the winding to the series contactor S to cause its armature to fall to the normal position. With the armature of the series contactor S in the normal position the series power connection is opened between the two pairs of motors connected in parallel and the winding of the contactor P2 is energized through the normally closed central pair of interlocking contacts of the series contactor S and conductors 53, 49, 51 and NC. The armature contacts of the parallel contactor P2 is accordingly moved upwardly to close the upper pair of power contacts and the two lower pairs of interlocking contacts thereon. Closure of the power contacts of the contactor P2 causes the other two motors M2 and M3 to be connected in parallel with the generator to complete the parallel motor connection. Closure of the central pair of interlocking contacts of contactor P2 sets up an energizing connection through conductors 29, 31 and 25 to the windings of the shunting contactors MS1 and MS2. Closure of the lower interlocking contacts of the contactor P2 establishes an energization connection comprising conductors PC, 55, 13, 17, 15, 1 and NC to the windings of the relays SR and BR to cause reenergization of the generator shunt and separately excited field winding thereby causing an increase in the output of the generator to its original value upon establishment of the parallel motor connection. As previously explained upon establishment of the parallel motor connection and movement of the power controller drum to the maximum output position $h$, the indicator will indicate the actual maximum value of 445 amperes load current per motor for the most efficient operation of the traction system at 30 miles per hour when the motors are connected in parallel. This value of load current is equal to the maximum value of current indicated by the indicator, namely 445 amperes for the most efficient operation of the traction system with the motors connected in parallel, which value is also the minimum value of current for the most efficient operation of the traction system with the motors connected in series-parallel-shunt and with the indicator sensitivity reduced, the minimum actual value of current per motor at this time being 565 amperes. The needle of the indicator will accordingly not re-enter the series-parallel-shunt indicator division 2 upon transition of the motor connections between the series-parallel-shunt and parallel circuit relations but will remain in division 3 of the indicator dial corresponding to the speed and load range for best operating efficiency of the traction system for the parallel motor circuit relation.

Figure 4:
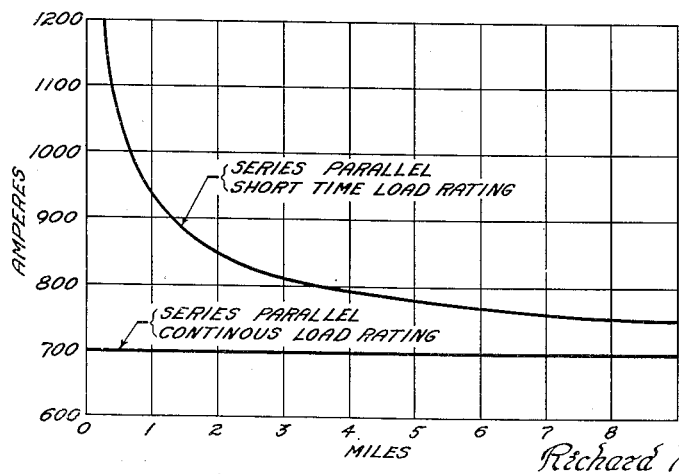
Figure 4 shows graphically the maximum load and distance curve for the traction system.

Maximum acceleration with the motors in parallel circuit relation is obtained by movement of the controller MPC to the maximum output position and the load current again falls off as the speed of the locomotive increases. When the locomotive speed increases to a value approximately 57 miles per hour the load current per motor falls to 292 amperes and the indicator needle I will be adjacent the left edge of the 300 ampere mark between divisions 3 and 4 on the dial. This value of current is the minimum value of current for the most efficient operation of the traction system when the motors are connected in parallel and is accordingly the proper value to change from the parallel to the parallel-shunt motor connection without causing current and torque surges on the units of the traction system. The change from the parallel to the parallel-shunt connection likewise requires movement of the controller MPC back to position e to cause a reduction in the output of the power plant and the release of the interlocking means and movement of the controller to position 4. Movement of the controller MTC to position 4 causes the two lower contacts of the controller to be bridged by the drum contact to cause energization of the windings shunting contactors MS1 and MS2 through the closed central pair of interlocking contacts of the parallel contactor P2 and conductors PC, 23, 29, 31, 25 and NC. The armatures of the shunting contactors MS1 and MS2 will accordingly move upwardly and again cause a reduction in the motor excitation and also a reduction in the sensitivity of the indicator. When the controller MPC is then moved to the maximum output position h the indicator needle will move to the right edge of the 300 ampere mark of the indicator dial division 3. This indicated value of 300 amperes is proportional to the actual current per motor of 385 amperes per motor for the most efficient operation of the traction system with the motors connected in series-parallel-shunt relation and operating at a speed of 57 miles per hour. Upon further increase in the locomotive speed to the maximum value of 70 miles per hour the indicator needle will move to the left in scale division 4 to the point shown in Figure 2. This position of the indicator needle in division 4 of the scale corresponds to the true minimum value of load current per motor, namely 370 amperes or one-fourth of the generator current as shown in Figure 4, for the most efficient operation of the traction system at the maximum speed of 70 miles per hour.

It is evident that to cause maximum acceleration of the locomotive to the maximum value of speed for decreasing values of load the power controller MPC was moved backward to reduce the output of the power plant and to unlock the interlocking means and the transition controller MTC was moved to the next higher position when the indicator needle indicated the minimum value of load current in each division of the indicator dial, which load values correspond to the most efficient operation of the traction system and increasing values of speed of 20, 30 and 57 miles per hour. Operation of the controls at these preselected decreasing values of load current and increasing values of speed prevents operation of the traction system at loads below maximum efficiency and also prevents current and torque surges and thereby prevents electrical mechanical stresses on the locomotive traction system and also prevents the indicator needle from re-entering the scale division corresponding to the particular motor connection changed from.

For increasing values of load on the locomotive and decreasing speed, the controllers are operated in the same manner and at the same speed values and indicated load values corresponding to maximum values of load per motor for each scale division and traction motor connection of the same number to likewise prevent operation of the traction system at loads above maximum operating efficiency of the traction system and to likewise prevent current and torque surges on the system and movement of the indicator needle from re-entering the scale division corresponding to the particular motor connection changed from.

With the above described connection arrangement it is evident that the change from the parallel to the parallel-shunt motor connection by movement of the transition controller MTC causes deenergization of the windings of the shunting contactors MS1 and MS2 and their armatures fall to the normal position. This causes the resistors R1 to R4 to be shunted out of the respective series field windings of the motors causing an increase in the motor excitation and a reduction in load current supplied thereto by the generator. The resistor IR in series with the indicator LI is also shunted at this time to increase the sensitivity thereof to prevent the indicator needle from re-entering the series-parallel-shunt division of the dial upon this decrease in load current.

The change from the parallel to the series-parallel-shunt connection by movement of the controller MTC from position 3 to position 2 causes deenergization of the winding of the relay PR and sets up an energizing connection to the lower interlocking contacts of the series contactor S. This causes the armature of relay PR to fall to the normal position and retain the windings of the relays SR and BR energized through the lower closed relay contacts and conductors PC, 11, 13, 17, 15, 1 and NC and causes the opening of the upper relay contacts and holding circuit comprising conductors PC, 39, 41, 53 and 49 and 51 to the windings of the parallel contactor. The armature of contactor P1 then falls to the normal position but due to the spring armature interlocking contacts provided winding of the series contactor S is energized before the winding of the parallel contactor is opened thereby maintaining the power circuit closed between the motors and generator during transition between the parallel and series-parallel-shunt motor connections. The shunting contactors are again energized by closure of the lower interlocking contacts of the series contactor to establish the series-parallel-connection and to decrease the sensitivity of the indicator in order to prevent re-entry of the indicator needle into the scale division 3 upon increase in current per motor but a decrease in the generator current.

The change from the series-parallel-shunt to the series-parallel motor connection by movement of the transition controller from position 2 to position 1 causes deenergization of the windings of the shunting contactors MS1 and MS2 and their armatures fall to the normal position to cause an increase in the motor excitation and a decrease in load current and to also cause an increase in the sensitivity of the indicator LI to prevent re-entry of the indicator needle into the scale division 2.

As explained before, when the load indicated is greater than the continuous rating mark CR in division 1 of the indicator dial the numbered mile marks in the right-hand higher load portion of the dial indicate the number of miles the locomotive can be operated without overloading and overheating of the traction system at maximum output of the power plant with the motors connected in the series-parallel starting circuit relation with the generator. The load can be reduced by movement of the power controller MPC backward or by reducing the number of cars in the train hauled by the locomotive.

The above described combined traction, control and indicating system for a locomotive enables operation thereof of a maximum efficiency at continuous maximum rated load or a short time rated load and prevents shocks to the locomotive or similar locomotives controlled and operated in multiple therewith and the train hauled thereby.

We claim:

1. A traction, control and indicating system for a locomotive comprising a generating electric power plant, a plurality of traction motors supplied with power from the power plant for driving individual wheeled axles of the locomotive, power connections including motor field shunting means and motor connection transferring means between the power plant and motors for causing operation of the combined generating electric traction system in different speed and torque ranges, a load indicator included in said power connections and having a scale provided with separate and distinct divisions, each scale division indicating the most efficient operating load range of the generating electric traction system for each motor connection with and without the motor fields shunted, and indicator sensitivity varying means operable in combination with the motor field shunting means to prevent overlapping indications between the scale divisions corresponding to each of the motor circuit relations with and without the motor fields shunted whereby the locomotive may be operated at maximum efficiency in each speed and torque range by operation of the motor field and motor connection transferring means in accordance with the load indications of the indicator.

2. A traction control and indicating system for a locomotive comprising a generating electric power plant, output varying means therefor, a plurality of traction motors supplied with power by the power plant and operatively connected to different wheeled driving axles of the locomotive, power connections including series, parallel and motor field shunting motor connection transferring means between the power plant and motors for causing the motors to be connected in series-parallel, series-parallel-shunt, parallel and parallel-shunt circuit relations with the power plant to obtain different speed, torque and load characteristics of the traction system, interlocking connections between said series, parallel and motor field shunting connection transferring means and power plant output varying means to cause a reduction in the power output of the power plant upon transfer of the motor connections from the series-parallel-shunt to the parallel motor circuit relation to prevent current and torque surges in the traction system, a load current indicator and indicator sensitivity varying means included in the power connections, said indicator having a scale with separate divisions, each division indicating the most efficient load current and speed range of the traction system for each motor circuit relation, said modifying means being operable in combination with the motor field shunting means to reduce the sensitivity of the indicator when the motors are connected in series-parallel-shunt and parallel-shunt relation so that a change between any of the motor circuit relations in accordance to the change in current indication between the scale divisions on the dial of the indicator causes minimum current and torque surges on the traction system to prevent overlapping of the current indications between the dial divisions of the indicator.

3. A traction control and indicating system for locomotive including a power plant comprising an engine and an electric generator driven thereby, means for varying the output of the power plant, a plurality of traction motors, each motor being operatively connected to an individual wheeled driving axle of the locomotive, power connections between the power plant generator and motors, said power connections including motor field shunting and connection changing means for causing the motor to be connected in series-parallel starting and series-parallel-shunt, parallel and parallel-shunt running circuit relations with the generator, an indicator associated in the power connections for indicating the current, said indicator having separate indicating divisions indicating ranges in the motor current corresponding to the most efficient operating characteristics of the traction system for each motor circuit relation, and means for reducing the sensitivity of the indicator, said means being operable in combination with the motor field shunting means for preventing overlapping indications between the indicating divisions of the indicator upon transfer of said connections corresponding to minimum and maximum current values in each range, the indicating division on the indicator corresponding to the series-parallel motor starting connection having subdivisions corresponding to the continuous load rating and to intermittent values of load rating of the traction system for the series-parallel motor connection corresponding to load speed high torque range of the motors, said subdivisions for said intermittent ratings being numbered to correspond to the distance the locomotive can be safely operated without damage to the traction system by overheating.

4. A traction, control and indicating system for a locomotive including a power plant comprising a prime mover, an electric generator driven thereby, means for varying the power output of the power plant, a plurality of electric traction motors for driving the locomotive, power connections including motor field shunting means and connection transferring means for connecting the motors in different power circuit relations with the power plant generator to cause operation of the traction system in different speed and load ranges, a load indicator included in said power connections, said indicator having adjacent load divisions indicating the most efficient operating characteristics of the traction system for each speed and load range and the maximum and minimum volues of load for causing transfer of said connections to cause smooth acceleration and deceleration of the locomotive, interlocking and control means between the power plant output varying means and the motor field shunting and connection transferring means to permit transfer of the motor connections only upon a reduction of the power output of the power plant in order to prevent fluctuations in the load on the traction system, and indicator sensitivity varying means operable in proper combination with said motor field shunting means to prevent overlapping of the indications between adjacent divisions of the indicator upon transfer of motor connections.

5. A traction and control and indicating system comprising an engine-generator power plant, speed, load and output regulating means therefor, a plurality of traction motors, power connections including means for shunting the motor fields and for transferring the motor connections to cause the motors to be connected in series-parallel, series-parallel-shunt, parallel and parallel-shunt power circuit relation with said power plant, interlocking connections between the power plant output regulating means and the motor field shunting and motor connection transferring means to cause a drastic reduction in the power supplied the motor upon transfer of the motor connections from the series-parallel-shunt to the parallel circuit relation to prevent sudden load changes on the power plant and motor, a manually operable master controller for controlling said output regulating means, a manually operable master transition controller for controlling said motor field shunting and connection transferring means, interlocking means between said controllers to allow transfer of the motor connections only when the speed, load and output of the power plant is reduced below the maximum value, a load indicator located adjacent the manually operable master controllers and connected in the power circuit, said indicator having a dial with separate adjacent divisions each indicating the most efficient range in load and speed for each motor connection corresponding to the motor circuit relations established by the master transition controller, the indicator scale division corresponding to the load range of the series-parallel motor circuit connection having such divisions indicating the continuous load rating of the traction system and the intermittent load ratings in values of distance the locomotive may be safely operated without damage to the locomotive traction system by overheating.

RICHARD M. DILWORTH.
TORSTEN O. LILLQUIST.